United States Patent [19]
Mestepey

[11] Patent Number: 5,346,684

[45] Date of Patent: Sep. 13, 1994

[54] RECOVERY OF ANHYDROUS HYDROGEN FLUORIDE FROM DEPLETED URANIUM HEXAFLUORIDE

[75] Inventor: James H. Mestepey, Muskogee, Okla.

[73] Assignee: Sequoyah Fuels Corporation, Gore, Okla.

[21] Appl. No.: 7,016

[22] Filed: Jan. 21, 1993

Related U.S. Application Data

[63] Continuation of Ser. No. 753,323, Aug. 30, 1991, abandoned.

[51] Int. Cl.$^5$ .............................. C01B 7/19; C01B 9/08
[52] U.S. Cl. .................................. 423/488; 423/489; 423/484; 423/483; 423/472
[58] Field of Search ............... 423/489, 484, 483, 472, 423/253, 254, 258, 19, 488

[56] References Cited

U.S. PATENT DOCUMENTS

| | | | |
|---|---|---|---|
| 3,168,369 | 2/1965 | Reese et al. | 12/14.5 |
| 3,333,930 | 8/1967 | Grant et al. | 423/253 |
| 3,765,844 | 10/1973 | Rode | 423/19 |
| 3,845,193 | 10/1974 | Littlechild et al. | 423/261 |
| 3,906,081 | 9/1975 | Welty | 423/261 |
| 3,947,558 | 3/1976 | van Eijl | 423/483 |
| 3,978,194 | 8/1976 | Knudsen et al. | 423/261 |
| 4,020,146 | 4/1977 | Knuden | 423/253 |
| 4,053,559 | 10/1977 | Hart et al. | 423/253 |
| 4,397,824 | 8/1983 | Butler et al. | 423/260 |
| 4,830,841 | 5/1989 | Urza | 423/258 |

Primary Examiner—Benjamin R. Fuller
Assistant Examiner—Valerie Ann Lund
Attorney, Agent, or Firm—Nydegger & Associates

[57] ABSTRACT

A method is provided for recovering an anhydrous hydrogen fluoride product from uranium hexafluoride gas by initially reacting the uranium hexafluoride in a primary reactor with steam to produce a uranyl fluoride intermediate and a gaseous mixture of hydrogen fluoride and water. The uranyl fluoride intermediate is fed to a secondary reactor and reacted with water to produce a triuranium octoxide product for disposal, and a gaseous mixture of water, hydrogen fluoride and oxygen. The two mixtures from the primary and secondary reactors are combined and subsequently separated in a distillation column to obtain an anhydrous hydrogen fluoride product stream and an aqueous azeotropic recycle stream containing water and hydrogen fluoride which is vaporized and returned to the primary reactor as the steam feed.

18 Claims, 1 Drawing Sheet

RECOVERY OF ANHYDROUS HYDROGEN FLUORIDE FROM DEPLETED URANIUM HEXAFLUORIDE

This is a continuation of co-pending application Ser. No. 07/753,323, filed on Aug. 30, 1991, now abandoned.

TECHNICAL FIELD

The present invention relates generally to treatment of depleted uranium compounds. More particularly, the present invention relates to a method for recovering anhydrous hydrogen fluoride from depleted uranium hexafluoride. The present invention particularly, though not exclusively, relates to a method for reacting uranium hexafluoride with water to produce anhydrous hydrogen fluoride.

BACKGROUND OF THE INVENTION

Processes for obtaining commercially useful uranium isotopes from uranium ore are well known. The processes typically comprise converting the naturally occurring uranium in the ore which contains several uranium isotopes to uranium hexafluoride Desirable uranium isotopes, such as $U^{235}$, are then extracted from the uranium hexafluoride by an enrichment process. The depleted uranium hexafluoride resulting from the enrichment process is a byproduct that is substantially depleted of $U^{235}$ and other desirable isotopes while rich in the less useful uranium isotopes such as $U^{238}$. Thus, depleted uranium hexafluoride has little commercial value, but is nevertheless somewhat radioactive and represents a difficult disposal problem.

Since no known safe and cost-effective method has been developed for disposing of depleted uranium hexafluoride, over the past several decades large quantities of the material have simply been encased in carbon steel cylinders and stored therein until a disposal alternative is developed. Clearly, storage of depleted uranium hexafluoride in its radioactive condition is not a long term solution to the problem because, although the material is relatively inert in the cylinder, exposure of the cylinder to the storage environment for a lengthy period of time can corrode the cylinder from the outside. If corrosion compromises the integrity of the cylinder, the resulting release of the noxious material to the environment, even in small quantities, creates a significant safety hazard.

While others have employed the chemical equations mentioned in the present invention, none has achieved the objectives of the present invention, or achieved the objects of the present invention in the manner those objectives are achieved in the present invention. The method of the present invention produces a commercially useful, valuable, almost pure hydrogen fluoride from depleted uranium fluoride produced as a byproduct of other reactor processes (the "Basic Processes"). Further the method of the present invention produces a residue product of $U_3O_8$, a byproduct which is far more easily disposable because $U_3O_8$ is less toxic than the usual and conventional byproducts of the Basic Processes.

Accordingly, a longstanding need exists for a method of disposing of depleted uranium hexafluoride. A method is particularly needed which is environmentally safe and cost-effective. More particularly, a need exists for a method of disposing of the material which provides an essentially permanent disposition thereof.

SUMMARY OF THE INVENTION

The present invention is a method for converting depleted uranium hexafluoride into two distinct and separable products. The first product is liquid anhydrous hydrogen fluoride recovered for commercial use. The second product is solid uranium octoxide which can be disposed in a conventional manner. A third composition resulting from the present method is a liquid azeotrope of water and hydrogen fluoride which is vaporized and recycled in part or in its entirety back into the process feedstock. In sum, the present method produces a commercially valuable material, while both reducing the volume of material for disposal and rendering the disposed material less noxious.

The method comprises combining two gaseous feed streams in a reactor. One feed stream is made up of depleted uranium hexafluoride and the other is made up of a gaseous recycle mixture of hydrogen fluoride and steam as well as additional fresh steam if desired. The uranium hexafluoride reacts with the steam in the reactor to produce a uranyl fluoride intermediate and a first gaseous mixture containing hydrogen fluoride and water. The first mixture and intermediate are separately recovered from the reactor. The intermediate is fed to a second reactor, while the first mixture is processed in a manner described hereafter.

Fresh steam is fed to the second reactor with the intermediate, and the steam and intermediate react therein to produce a triuranium octoxide product and a second gaseous mixture containing water, hydrogen fluoride, and oxygen. The second mixture and triuranium octoxide product are separately recovered from the second reactor. The triuranium octoxide product is isolated for disposal, while the second mixture is combined with the first mixture from the initial reactor to form a third mixture which is fed to a separation unit. The third mixture is separated in the separation unit into two outlet streams. One outlet stream is a gaseous mixture of oxygen and anhydrous hydrogen fluoride which is substantially free of water. The other outlet stream is a liquid azeotrope made up of hydrogen fluoride and water. The mixture of oxygen and anhydrous hydrogen fluoride is fed to a condenser where the two components are separated into a liquid anhydrous hydrogen fluoride product which is recovered for subsequent commercial use, and gaseous oxygen which is vented to a scrubber. Meanwhile, the liquid azeotrope is vaporized and recycled in part or in its entirety back to the initial reactor to supply reactant thereto and reduce the fresh steam feed requirement, if any.

The novel features of this invention, including its operation will be best understood from the accompanying drawing, taken in conjunction with the accompanying description, in which:

DESCRIPTION OF PREFERRED EMBODIMENTS

Figure 1:
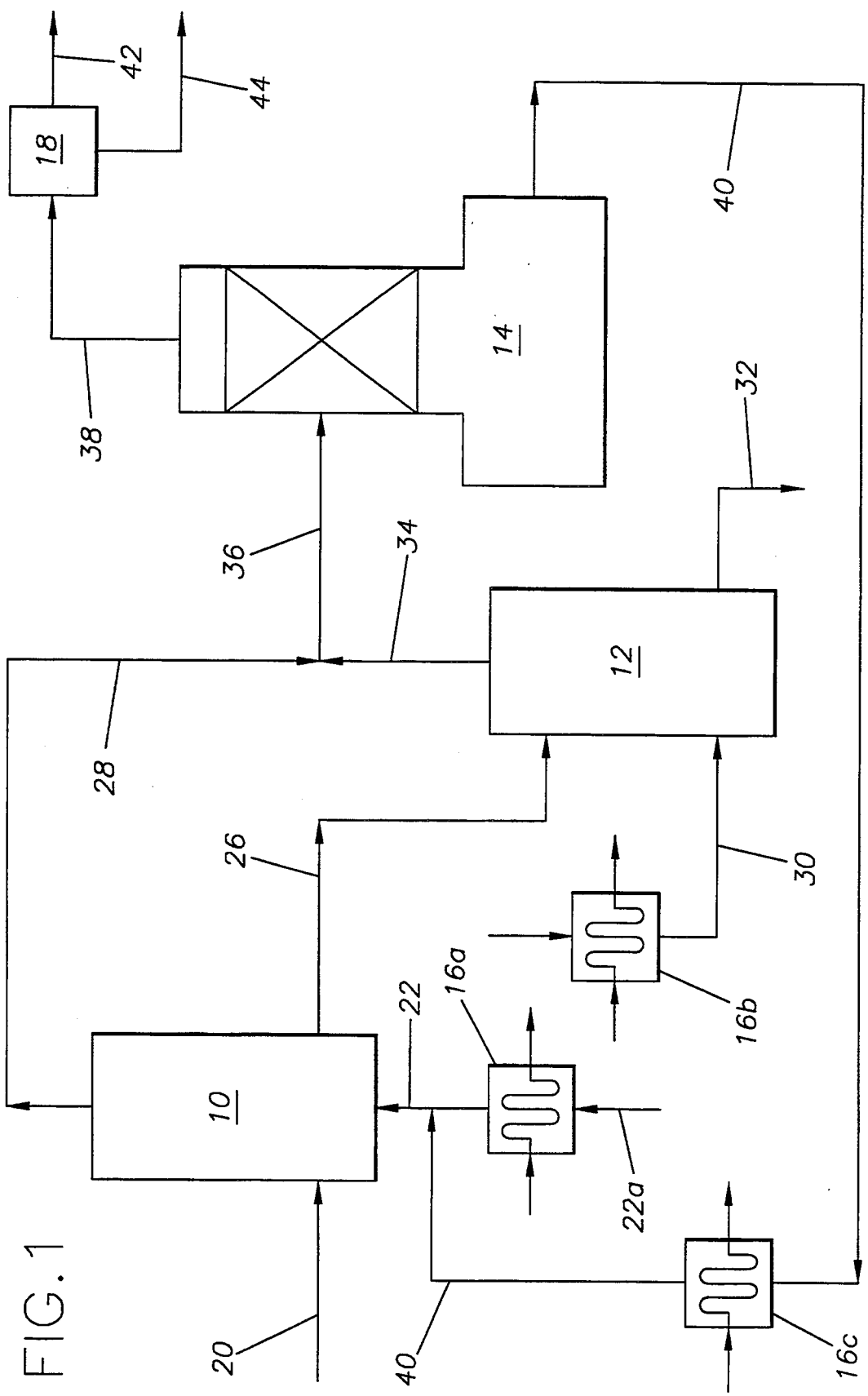
FIG. 1 is a schematic flowchart of the method of the present invention.

With reference to FIG. 1, the operational units employed in the method of the present invention include a first reactor 10, a second reactor 12, a separation unit preheaters 16a, 16b, 16c, and a condenser 18. The material streams defined by the method are designated 20-44, and are further described with reference thereto.

Two feed streams 20, 22 are initially fed to first reactor 10 for reaction therein. Feed stream 20 comprises depleted uranium hexafluoride ($UF_6$) in a gaseous state. Feed stream 22 comprises recycle steam from separation unit 14 to be characterized hereafter, and a fresh steam stream 22a from preheater 16a if desired. The water content of stream 22 is preferably in stoichiometric excess of stream 20, and most preferably at an excess of from about 100 to about 500%. Mixing of streams 20, 22 is preferably performed internal to first reactor 10.

First reactor 10 is maintained at a temperature between about 400° and 800√ F., and preferably between about 500° and 600° F. and further maintained at a pressure between about 1.0 and about 2.5 atm, and preferably between about 1.0 and 1.5 atm. The uranium hexafluoride and water react therein to produce two reactor outlet streams 26, 28 according to the generalized reaction equation (1):

$$UF_6 + 2 H_2O \rightarrow UO_2F_2 + 4 HF \qquad (1)$$

As equation (1) indicates, outlet stream 26 comprises solid uranyl fluoride ($UO_2F_2$) and outlet stream 28 comprises a first gaseous mixture of hydrogen fluoride and water. Outlet streams 26, 28 are recovered separately from first reactor 10 and stream 26 is fed to second reactor 12. Also fed to second reactor 12 is stream 30 which consists of steam from preheater 16b. The water content of stream 30 is preferably in stoichiometric excess of stream 26, and most preferably at an excess of from about 200 to about 300%.

The steam reacts with the uranyl fluoride in second reactor 12 which is maintained at a temperature between about 800° and 1100° F., and preferably between about 850 ° and 950° F., and further maintained at a pressure between about 1.5 and about 2.5 atm, and preferably between about 1.0 and 1.5 atm. The reaction product of water and uranyl fluoride in second reactor 12 is reactor outlet streams 32, 34, which are characterized according to the generalized reaction equation (2):

$$3 UO_2F_2 + 3 H_2O \rightarrow U_3O_8 + 6HF + \tfrac{1}{2}O_2 \qquad (2)$$

As equation (2) indicates, outlet stream 32 comprises solid triuranium octoxide ($U_3O_8$) product and outlet stream 34 comprises a second gaseous mixture of water, hydrogen fluoride, and oxygen. Outlet streams 32, 34 are recovered separately from second reactor 12 and the triuranium octoxide of stream 32 is isolated from the process for disposal. Stream 34 is combined with stream 28 off of first reactor 10 to form stream 36 comprising a mixture of water, hydrogen fluoride, and oxygen, which is further processed in separation unit 14.

Depending on the temperature and pressure conditions of stream 36, it may be entirely in a gaseous state or it may be in two states, wherein the water and hydrogen fluoride are in a liquid state and oxygen is in a gaseous state. It is further understood that combining of streams 28 and 34 to form stream 36 within the scope of the present invention encompasses mixing of streams 28 and 34 upstream of unit 14 or within unit 14.

In any case, separation unit 14 is preferably a conventional distillation column, wherein stream 36 is separated into a gaseous outlet stream 38, and a liquid outlet stream 40. Outlet stream 38 is characterized as a gaseous mixture of oxygen and anhydrous hydrogen fluoride which is substantially free of water, i.e., containing less than about 500 ppm water. Outlet stream 38 may be subsequently fed to condenser 18, where it is separated into streams 42, 44. Stream 42 is substantially pure commercial grade liquid anhydrous hydrogen fluoride and stream 44 is oxygen gas which may be vented to a scrubber (not shown).

Outlet stream 40 is a liquid azeotrope of hydrogen fluoride and water. The composition of the azeotrope is about 38% anhydrous hydrogen fluoride and 62% water by weight. Stream 40 is vaporized in preheater 16c and recycled back into stream 22 in part or in its entirety where it is fed to first reactor 10 as a substitute or supplement for stream 22a.

The following examples demonstrate the practice and utility of the present invention, but are not to be construed as limiting the scope thereof.

EXAMPLES

By way of example, five runs of the present method are performed wherein the percentage of excess feed to the first and second reactors is varied in each run. In the first example, 150% excess water from recycle is fed to the first reactor and 300% excess water is fed to the second reactor. In the second example, 200% excess water from recycle is fed to the first reactor and 300% excess water is fed to the second reactor. In the third example, 250% excess water from recycle is fed to the first reactor and 300% excess water is fed to the second reactor. In the fourth example, 400% excess water from recycle is fed to the first reactor and 300% excess water is fed to the second reactor. In the fifth example 500% excess water from recycle is fed to the first reactor and 300% excess water is fed to the second reactor.

Material balances are provided in Tables I–V below, which correspond to Examples 1–5, respectively. The basis for each run is 100 lbs of $UF_6$ feed, thus each data point in Tables I–V is expressed in units of lbs. The column headings in the tables correlate to the correspondingly referenced units or streams of FIG. 1.

EXAMPLE 1

TABLE I

|  | 10 | 28 | 26 | 30 | 32 | 34 | 36 | 40 | 38 |
|---|---|---|---|---|---|---|---|---|---|
| $UF_6$ | 100.00 | | | | | | | | |
| $H_2O$ | 15.33 | 5.11 | | 15.33 | | 10.22 | 15.33 | 15.33 | |
| HF | 9.40 | 32.13 | | | | 11.36 | 43.48 | 9.40 | 34.10 |
| $UO_2F_2$ | | | 87.50 | | | | | | |
| $U_3O_8$ | | | | | 79.73 | | | | |
| $O_2$ | | | | | | 1.51 | 1.51 | | 1.51 |
| TOTAL | 124.73 | 37.24 | 87.5 | 15.33 | 79.73 | 23.09 | 60.32 | 24.73 | 35.61 |

EXAMPLE 2

TABLE II

|        | 10     | 28    | 26    | 30    | 32    | 34      | 36     | 40    | 38    |
|--------|--------|-------|-------|-------|-------|---------|--------|-------|-------|
| $UF_6$ | 100.00 |       |       |       |       |         |        |       |       |
| $H_2O$ | 20.44  | 10.22 |       | 15.33 |       | 10.22   | 20.44  | 20.44 |       |
| HF     | 12.53  | 35.26 |       |       |       | 11.36   | 46.62  | 12.53 | 34.10 |
| $UO_2F_2$ |     |       | 87.50 |       |       |         |        |       |       |
| $U_3O_8$ |      |       |       |       | 79.73 |         |        |       |       |
| $O_2$  |        |       |       |       |       | 1.51    | 1.51   |       | 1.51  |
| TOTAL  | 132.97 | 45.48 | 87.5  | 15.33 | 79.33 | 23.0975 | 68.57  | 32.97 | 35.61 |

EXAMPLE 3

TABLE III

|        | 10     | 28    | 26    | 30    | 32    | 34    | 36    | 40    | 38    |
|--------|--------|-------|-------|-------|-------|-------|-------|-------|-------|
| $UF_6$ | 100.00 |       |       |       |       |       |       |       |       |
| $H_2O$ | 25.55  | 15.33 |       | 15.33 |       | 10.22 | 25.55 | 25.55 |       |
| HF     | 15.66  | 38.39 |       |       |       | 11.36 | 49.75 | 15.11 | 34.10 |
| $UO_2F_2$ |     |       | 87.50 |       |       |       |       |       |       |
| $U_3O_8$ |      |       |       |       | 79.73 |       |       |       |       |
| $O_2$  |        |       |       |       |       | 1.51  | 1.51  |       | 1.51  |
| TOTAL  | 141.21 | 53.72 | 87.5  | 15.33 | 79.73 | 23.09 | 76.81 | 41.21 | 35.61 |

EXAMPLE 4

TABLE IV

|        | 10     | 28    | 26    | 30    | 32    | 34      | 36     | 40    | 38    |
|--------|--------|-------|-------|-------|-------|---------|--------|-------|-------|
| $UF_6$ | 100.00 |       |       |       |       |         |        |       |       |
| $H_2O$ | 40.88  | 30.66 |       | 1.33  |       | 10.22   | 40.88  | 40.88 |       |
| HF     | 25.06  | 47.79 |       |       |       | 11.36   | 59.14  | 25.06 | 34.10 |
| $UO_2F_2$ |     |       | 87.50 |       |       |         |        |       |       |
| $U_3O_8$ |      |       |       |       | 79.73 |         |        |       |       |
| $O_2$  |        |       |       |       |       | 1.51    | 1.51   |       | 1.51  |
| TOTAL  | 165.94 | 78.45 | 87.5  | 15.33 | 79.73 | 21.5775 | 101.53 | 65.94 | 35.61 |

EXAMPLE 5

TABLE V

|        | 10     | 28    | 26    | 30    | 32    | 34    | 36     | 40    | 38    |
|--------|--------|-------|-------|-------|-------|-------|--------|-------|-------|
| $UF_6$ | 100.00 |       |       |       |       |       |        |       |       |
| $H_2O$ | 51.10  | 40.88 |       | 15.33 |       | 10.22 | 51.10  | 51.10 |       |
| HF     | 31.32  | 54.05 |       |       |       | 11.36 | 65.41  | 31.32 | 34.10 |
| $UO_2F_2$ |     |       | 87.50 |       |       |       |        |       |       |
| $U_3O_8$ |      |       |       |       | 79.73 |       |        |       |       |
| $O_2$  |        |       |       |       |       | 1.51  | 1.51   |       | 1.51  |
| TOTAL  | 182.42 | 94.93 | 87.50 | 15.33 | 79.73 | 23.09 | 118.02 | 82.42 | 35.61 |

From the Examples, it is apparent that the method of the invention diminishes the amount of waste to be disposed by about 20 weight %, while producing about 34 lbs of commercial grade anhydrous hydrogen fluoride product for every 100 lbs of uranium hexafluoride feed.

While the particular process for recovery Of anhydrous hydrogen fluoride from depleted uranium hexafluoride as herein shown and disclosed in detail is fully capable of obtaining the objects and providing the advantages herein before stated, it is to be understood that it is merely illustrative of the presently preferred embodiments of the invention and that no limitations are intended to the details of operation herein shown other than as described in the appended claims.

I claim:

1. A method for recovering an anhydrous hydrogen fluoride product from depleted gaseous uranium hexafluoride comprising the steps of:

reacting said depleted gaseous uranium hexafluoride in a first reaction zone with a first gaseous water feed by gas contacting to produce a uranyl fluoride intermediate and a first mixture of hydrogen fluoride and water;

reacting said uranyl fluoride intermediate from said first reaction zone with a second water feed in a second reaction zone to produce a triuranium octoxide product and a second mixture made up of water, hydrogen fluoride and oxygen;

combining said first and second mixtures to form a third mixture made up of water, hydrogen fluoride and oxygen;

distilling said third mixture in a separation zone to produce an anhydrous product stream containing said anhydrous hydrogen fluoride product and oxygen, and an aqueous stream made up of a water and hydrogen fluoride azeotrope; and combining said aqueous stream with said depleted gaseous uranium hexafluoride in said first reaction zone.

2. A method for recovering an anhydrous hydrogen fluoride product from depleted uranium hexafluoride as recited in claim 1, wherein said aqueous stream is in a liquid state.

3. A method for recovering an anhydrous hydrogen fluoride product from depleted uranium hexafluoride as recited in claim 1, further comprising separating oxygen from said anhydrous product stream to isolate said anhydrous hydrogen fluoride product.

4. A method for recovering an anhydrous hydrogen fluoride product from depleted uranium hexafluoride as recited in claim 1, wherein said second water feed comprises fresh steam.

5. A method for recovering an anhydrous hydrogen fluoride product from depleted uranium hexafluoride as recited in claim 1, further comprising disposing said triuranium octoxide product.

6. A method for recovering an anhydrous hydrogen fluoride product from depleted uranium hexafluoride as recited in claim 1, wherein said third mixture is made up of gaseous oxygen and a liquid solution of water and hydrogen fluoride.

7. A method for recovering an anhydrous hydrogen fluoride product from depleted uranium hexafluoride as recited in claim 1, wherein said first and second mixtures are in a gaseous state.

8. A method for recovering an anhydrous hydrogen fluoride product from depleted uranium hexafluoride as recited in claim 1, wherein said aqueous stream is a liquid azeotrope of water and hydrogen fluoride.

9. A method for recovering an anhydrous hydrogen fluoride product from depleted uranium hexafluoride as recited in claim 1, wherein said first water feed contains a stoichiometric excess of water.

10. A method for recovering an anhydrous hydrogen fluoride product from depleted uranium hexafluoride as recited in claim 1, wherein said second water feed contains a stoichiometric excess of water.

11. A method for recovering an anhydrous hydrogen fluoride product from depleted uranium hexafluoride as recited in claim 1, further comprising heating said aqueous stream to form a gaseous recycle stream.

12. A method for recovering an anhydrous hydrogen fluoride product from depleted uranium hexafluoride as recited in claim 11, further comprising recycling said gaseous recycle stream into said first gaseous water feed.

13. A method for recovering an anhydrous hydrogen fluoride product from depleted uranium hexafluoride as recited in claim 11, wherein said first gaseous water feed consists essentially of said gaseous recycle stream.

14. A method for recovering an anhydrous hydrogen fluoride product from depleted uranium hexafluoride as recited in claim 11, wherein said first gaseous water feed comprises fresh stream and a gaseous mixture of steam and hydrogen fluoride from said recycle gaseous stream.

15. A method for recovering an anhydrous hydrogen fluoride liquid product from depleted uranium hexafluoride gas comprising the steps of:

reacting said depleted uranium hexafluoride gas in a first reaction zone with a first steam feed to produce a uranyl fluoride intermediate and a first gaseous mixture of hydrogen fluoride and water;

reacting said uranyl fluoride intermediate with a second steam feed in a second reaction zone to produce a triuranium octoxide product and a second gaseous mixture of water, hydrogen fluoride and oxygen;

combining said first and second gaseous mixtures to form a third mixture, hydrogen fluoride and oxygen;

separating said third mixture in a separation zone to produce an anhydrous liquid product stream containing said anhydrous hydrogen fluoride liquid product and oxygen, and an azeotropic liquid stream containing water and hydrogen fluoride;

vaporizing said azeotropic liquid stream to form a gaseous recycle stream containing steam and hydrogen fluoride; and recycling said gaseous recycle stream to said first steam feed.

16. A method for recovering an anhydrous hydrogen fluoride liquid product from a depleted uranium hexafluoride gas as recited in claim 15 further comprising separating oxygen and said anhydrous hydrogen fluoride liquid product in said product stream.

17. A method for recovering an anhydrous hydrogen fluoride liquid product from a depleted uranium hexafluoride gas as recited in claim 15 wherein said first steam feed consists essentially of said gaseous recycle stream.

18. A method for recovering an anhydrous hydrogen fluoride liquid product from a depleted uranium hexafluoride gas as recited in claim 15 further comprising condensing said third mixture into gaseous oxygen and a liquid solution made up of water and hydrogen fluoride before separating said third mixture.

* * * * *